Dec. 9, 1924.
D. B. BAIMA
TIRE CARRIER
Filed April 18, 1922   2 Sheets-Sheet 2
1,518,295
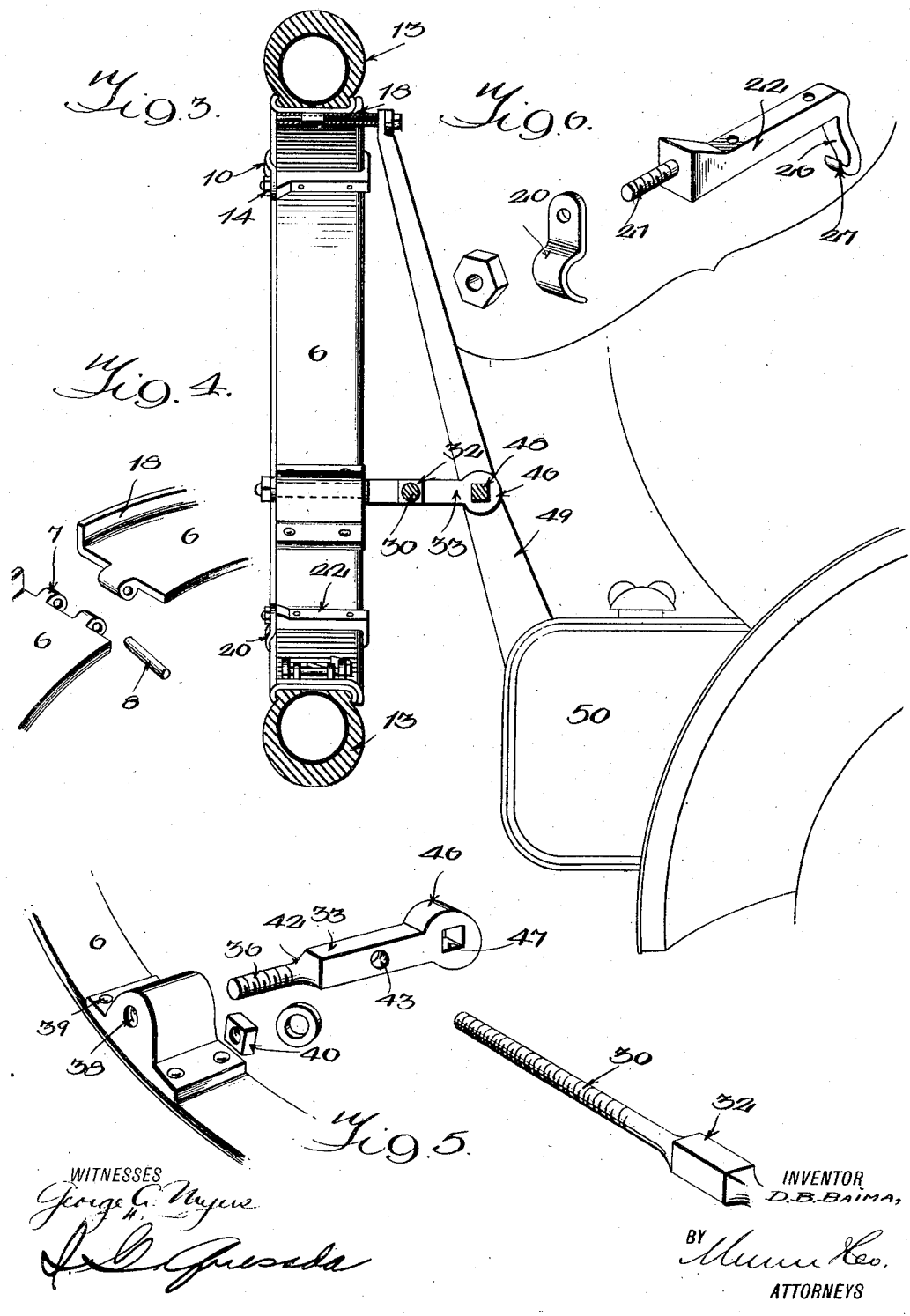

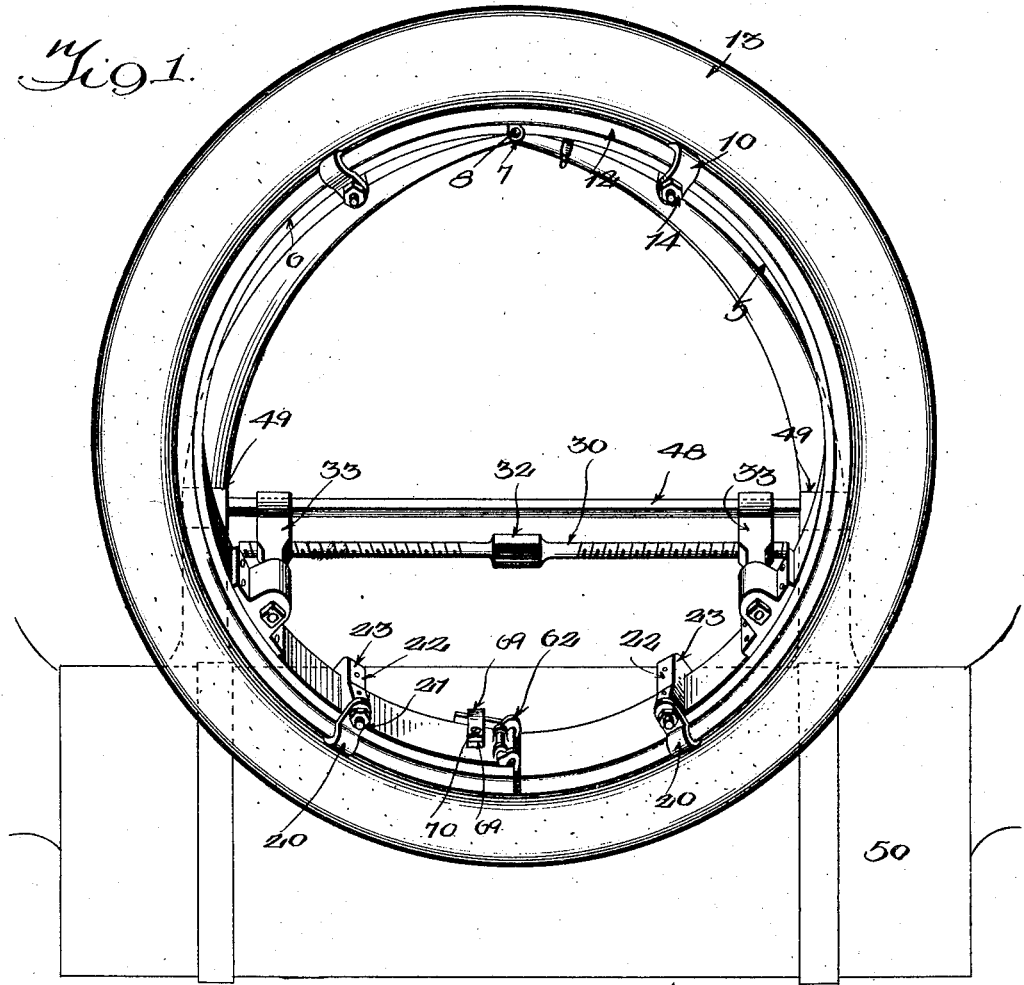
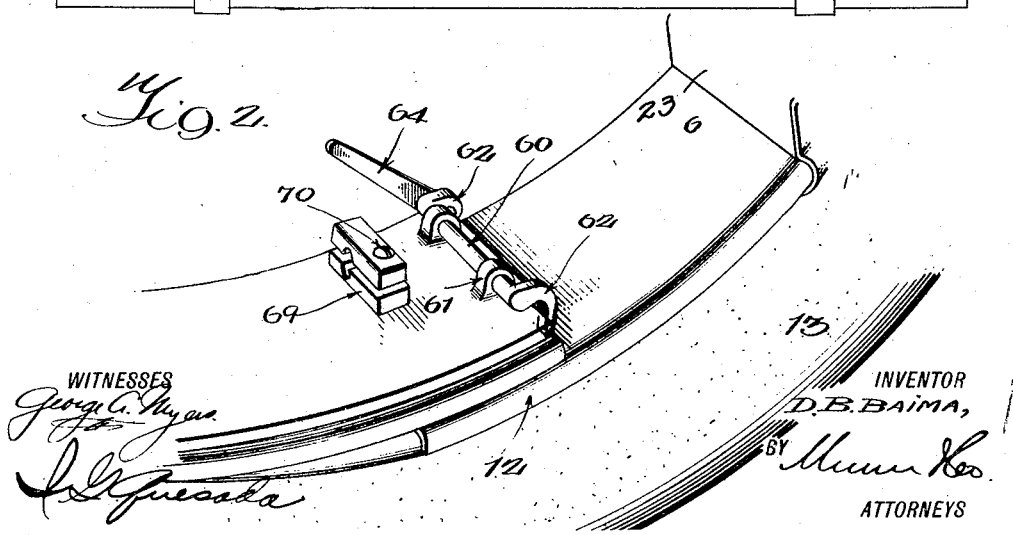

Patented Dec. 9, 1924.

1,518,295

UNITED STATES PATENT OFFICE.

DOMINICK B. BAIMA, OF DETROIT, MICHIGAN.

TIRE CARRIER.

Application filed April 18, 1922. Serial No. 555,448.

*To all whom it may concern:*

Be it known that I, DOMINICK B. BAIMA, a citizen of the United States, and resident of Detroit, in the county of Wayne and State of Michigan, have invented certain new and useful Improvements in Tire Carriers, of which the following is a specification.

This invention relates to tire carriers especially adapted for application to motor vehicles.

An important object is to provide a tire carrier having novel means whereby the same may be employed for contracting a tire rim preparatory to removing the tire from the rim.

Further, the invention aims to provide a tire carrier having simple means whereby the ends of the same may be guided into overlapping relation as the carrier is contracted for the purpose of contracting the tire rim.

Also the invention aims to provide a tire carrier which may be expanded into firm engagement with the tire rim so that the loss of the tire is positively prevented.

A further object is to provide a tire carrier which is neat in appearance, of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a perspective of the improved tire carrier applied.

Figure 2 is a fragmentary perspective illustrating the means for guiding the ends of the tire carrier into overlapping relation.

Figure 3 is a vertical transverse sectional view through the improved tire carrier applied.

Figure 4 is a fragmentary perspective of the upper ends of the tire carrier sections.

Figure 5 is a fragmentary perspective view illustrating the lower portion of the tire carrier and the supporting bolt associated therewith.

Figure 6 is a perspective of a rim engaging member embodied in the invention.

In the drawing wherein for the purpose of illustration is shown a preferred embodiment of the invention the numeral 5 generally designates the improved tire carrier, the body of which is in the form of an annulus and which consists of a pair of semi-circular sections 6 having their upper portions formed with aligned hinge barrels 7 through which a pivot element 8 is extended. It is thus seen that the sections 6 of the annulus are hingedly connected so that the annulus may be expanded or contracted by an adjustment which may be made by means to be more fully hereinafter described.

As illustrated in Figure 1 the upper portions of the sections 6 are provided with clamps 10 which are forced into engagement with the rim 12 of the tire 13 by means of nuts 14. The clamps 10 may be of any desired type and serve as a positive means for connecting the upper portions of the sections 6 to the tire rim so that the loss of the tire rim and consequently the tire is positively prevented.

As illustrated in Figure 3 the inner edge portion of the annulus is extended outwardly to provide a flange 18 which limits the inward movement of the tire rim.

The lower portions of the sections 6 are securely engaged with the tire rim 12 by means of hooks 20 mounted on the threaded shanks 21 of transversely extending hook bars 22 which may be riveted as indicated at 23 to the sections 6.

The transversely extending bars 22 terminate beyond the inner edges of the sections 6 and are extended laterally as indicated at 26 for providing hooks which positively engage the rim of the tire. As illustrated in Fig. 6 the hooks 26 are provided with bills 27 which grip the outer edge of the rim so that when the annulus is contracted the rim of the tire will also be contracted. This decreases the diameter of the tire rim so that the tire may be conveniently removed.

It is thus seen that the tire rim 12 is securely connected to the annulus so that when the annulus is expanded or contracted the diameter of the tire rim will be varied. The sections 6, of which there are two, may be moved inwardly or outwardly by means of an adjusting member 30 in the nature of a shaft having its end portions oppositely screw threaded. The intermediate portion of the shaft 30 is squared as indicated at 32 for engagement with a wrench or the like so that when desired the shaft may be rotated in either direction.

The end portions of the shaft 30 have threaded engagement with traveling arms 33 threaded as indicated at 34 for the reception of the end portions of the shaft. As illustrated in Figure 5 the forward portion of each arm 33 is screw threaded as indicated at 36 and is extended through brackets 38 secured to the sections 6 as indicated at 39. In carrying out the invention a nut 40 is threaded on each bolt member 36 and serves to positively hold the arm 33 in engagement with the bracket.

Each bolt 36 may be formed rearwardly of the threads thereon with shoulders 42 which engage the inner sides of the bracket so as to limit the endwise movement of the arm. When the shaft 30 is rotated in one direction the travelling arms 33 are further separated so as to expand the annulus formed by the sections 6. On the other hand when the shaft is rotated in the other direction the traveling arms 33 are drawn closer together so as to contract the annulus and thereby contract the tire rim so that the tire may be removed without excessive effort on the part of the operator.

One terminal portion of each traveling arm 33 is formed with a head 46 having a squared transversely extending opening 47 which is freely slidable on a squared supporting rod 48. The supporting rod 48 which is square in cross section has its ends supported by means of a pair of brackets 49 secured to the tank 50 or any other suitable portion of the motor vehicle such as the body, or the chassis. The brackets 49 are extended above the rod 48 and are connected to the pivot 8.

As illustrated in Figure 2 one of the sections 6 is provided with a transversely extending shaft or bar 60 having curved fingers 62 adapted to be arranged between the ends of the rim when it is desired to move the same in to overlapping relation. One of the fingers 62 is provided with an operating handle 64 by means of which the number 60 may be turned in the bearings 61 to properly position the fingers 62.

It will be seen that when the gradually tapered fingers 62 are forced between the ends of the rim as illustrated in Figure 1 the subsequent turning of the handle 64 will cause the ends of the rim to move into overlapping relation as illustrated in Figure 2. The shaft 30 may now be turned for further contracting the rim.

In carrying out the invention the handle may be secured in a set position by means of a two-part clamp 69, the sections of which may be drawn together by means of a screw bolt 70. The two part clamp is of course carried by one of the sections 6. An operating handle 64 is connected to one of the fingers 62 and forms a means whereby the shaft 60 may be rotated for properly positioning the fingers 62. The handle 64 is held in position by means of a two part clamp 69 comprising two sections having their opposed sides formed with notches to receive the handle. A fastening device 70 of any desired type may be employed for connecting the sections of the clamp 69.

In operation the sections 6 are secured in firm engagement with the rim of the tire so as to hold the tire firmly in position. When it is desired to remove the tire from the rim it is merely necessary to draw the ends of the rim into overlapping relation by the proper movement of the shaft 30 and with the aid of the parts 60 to 64 inclusive. The tire may now be removed and the rim contracted by the contraction of the carrier and when desired the tire may be conveniently replaced.

Having thus described the invention, what I claim is:—

1. A tire carrier comprising a split body, arms securely carried by said body and projecting laterally therefrom, a feed screw having threaded engagement with said arms, and a second shaft slidably supporting the arms, said feed shaft being adapted to contract and enlarge said split body.

2. A tire carrier comprising a split body, arms securely carried by said body, a feed shaft having threaded engagement with said arms, and means slidably and non-rotatably supporting said arms and extending in parallel relation to said shaft, said feed shaft being adapted to contract and enlarge said split body.

3. A tire carrier comprising an annulus having a pair of hingedly connected sections, brackets carried by said sections at points spaced from the ends thereof, a shaft having its end portions oppositely screw threaded, arms threaded on said shaft and securely connected to said brackets, and means slidably supporting said arms.

4. A tire carrier comprising a pair of hingedly connected sections, brackets carried by said sections at points spaced from the ends thereof, a shaft having its end portions oppositely screw threaded, arms threaded on said shaft and securely connected to said brackets, means slidably supporting said arms, and means to guide the ends of a tire rim into overlapping relation.

DOMINICK B. BAIMA.